United States Patent
Richardson et al.

Patent Number: 5,685,371
Date of Patent: Nov. 11, 1997

[54] HYDROCARBON-ASSISTED THERMAL RECOVERY METHOD

[75] Inventors: William Charles Richardson, Bellaire; Donald Stephen Mims, Houston; Kevin David Kimber, Sugar Land, all of Tex.; Arthur Ruch Deemer, Bakersfield, Calif.

[73] Assignee: Texaco Inc., White Plains, N.Y.

[21] Appl. No.: 411,367

[22] Filed: Jun. 15, 1995

[51] Int. Cl.$^6$ ............................................. E21B 43/22
[52] U.S. Cl. .................................... 166/272; 166/303
[58] Field of Search ................................ 166/272, 273, 166/274, 275, 303

[56] References Cited

U.S. PATENT DOCUMENTS

| | | | |
|---|---|---|---|
| 4,004,636 | 1/1977 | Brown et al. | 166/273 X |
| 4,034,812 | 7/1977 | Widmyer. | |
| 4,556,495 | 12/1985 | Shaw | 166/275 X |
| 4,561,501 | 12/1985 | Shaw et al. | 166/274 X |
| 5,092,405 | 3/1992 | Prukop | 166/273 X |
| 5,095,989 | 3/1992 | Prukop | 166/273 X |

OTHER PUBLICATIONS

W. C. Richardson et al., "Composition of Remaining Oil in a Mature Steamflood," SPE/DOE 27796, presented at SPE/DOE Ninth Symposium on Improved Oil Recovery held in Tulsa, Okla., Apr. 17, 1994, pp. 137–151.

Roger M. Butler, *Thermal Recovery of Oil & Bitumen*, Prentice–Hall, Inc., 1991, pp. 168–173.

Texaco E & P Tech.Dept. Library Literature Search, 94–306, thru week 31 (1994).

K. D. Kimber, "Scaled Physical Modeling of Steam–Injection Experiments," *SPE Reservoir Engineering*, Aug. 1991.

R.S. Johnson et al., *SPE Reservoir Engineering*, 7, 75 (1992).

*Primary Examiner*—William P. Neuder
*Attorney, Agent, or Firm*—Henry H. Gibson; Harold J. Delhommer

[57] ABSTRACT

A method of enhancing recovery of viscous petroleum is provided. A hydrocarbons mixture comprising hydrocarbons having a selected range of boiling points, all higher than that of water, is injected at relatively low concentrations along with steam. The range and distribution of hydrocarbon boiling points in the mixture to be injected may be selected by experiment or calculations.

11 Claims, 1 Drawing Sheet

5,685,371

HYDROCARBON-ASSISTED THERMAL RECOVERY METHOD

FIELD OF THE INVENTION

This invention pertains to recovery of highly viscous petroleum from subterranean formations. More particularly, a method is provided for increasing recovery of petroleum in thermal recovery processes by injection of hydrocarbons having boiling points within a selected range.

BACKGROUND OF THE INVENTION

There are many subterranean deposits of petroleum in which the petroleum is too viscous to be displaced from the deposit using methods normally applied for recovery of petroleum. It has been found that application of heat to many of these subterranean deposits causes the viscosity of the petroleum to be lowered sufficiently that it will flow to production wells. By far the most common method of applying heat to the petroleum is by injection of steam into the formation containing the petroleum. Other methods of thermal recovery include the injection of hot water and the injection of oxygen to cause in situ combustion of the petroleum. With the extremely large amounts of heavy petroleum existing in the world, there is a great economic incentive to improve the thermal recovery processes.

Heat can be injected into a subterranean formation more rapidly by steam injection than by injection of hot water, so most recovery projects employ steam. The quality, temperature and pressure of the steam vary widely, dependent upon oil properties and reservoir conditions in each project. To start some projects, steam is injected in wells for a time and then the same wells are converted to production wells. This is called a cyclic recovery process. This process may be followed by a steam flood, in which steam is injected in one set of wells and steam and petroleum are produced from another set of wells. The steam flood period is often followed by a time in which gravity becomes important as a recovery mechanism, causing the oil to flow to the lower part of a formation and into production wells. In some instances, gravity has been employed as a primary force for production, by placing horizontal production wells under steam injection zones. The strong tendency of steam to override the petroleum and move along the top of a formation is a factor which must be considered in any recovery process based on steam injection. The various thermal recovery processes and reservoir flow characteristics of each are described in detail in the book *Thermal Recovery of Oil and Bitumen*, by Roger M. Butler, Prentice-Hall, 1991.

While it is realized that the action of steam on very viscous petroleum lowers the viscosity of the petroleum, thereby allowing it to move to a producing well more easily, steam also acts on the more volatile components of the oil and distills these components. Some of the distilled or vaporized hydrocarbon travels with the steam and is produced in production wells as vapor or condensate. Volatilized hydrocarbons may also condense in the cooler regions of the reservoir. The reservoir-condensed hydrocarbons form a lighter hydrocarbon bank or zone which may act as a solvent bank and aid in reducing the oil saturation in a miscible-type flood mechanism. The effect of steam distillation in steam flooding processes is discussed in the above-referenced book by Butler, pages 168-173.

U.S. Pat. No. 4,034,812 discloses injection of low molecular weight hydrocarbon solvents for promoting separation of unconsolidated sand matrix material from viscous petroleum after heat has been applied to a formation. The injection of low molecular weight hydrocarbons into a reservoir undergoing steam flooding has also been suggested as a means to improve recovery. The action of these additives has been marginal in improving steamflood oil recovery. This is probably due to the fact that most of the low molecular weight additive moves quickly through the formation and is produced in the vapor phase.

The compositional variations of petroleum remaining in a formation after a steam flood were measured in a study reported in the paper SPE/DOE 27796 by Richardson and Chu, Society of Petroleum Engineers, 1994. In this study, core samples of the formation, which contained oil, were taken from a range of depths. The oil was extracted from the cores and chemically analyzed using special techniques developed for examining the hydrocarbon content of heavy, viscous petroleum. The samples included depths in the steam zone, at and near the interface between the steam zone and the underlying oil zone, and far below the steam zone. Compositional variations of the oil with depth showed that hydrocarbons having an "equivalent alkane carbon number" (EACN) from the lightest hydrocarbon present in the petroleum up to about 37 were removed from the residual petroleum in the steam zone and certain hydrocarbons were concentrated in a condensation zone near the steam-oil interface.

The EACN approximation is a way of generating a more chemically meaningful compositional distribution of oil components, which are approximated to be normal alkanes. The EACN approximation takes the measured boiling point curve of a crude oil and breaks it up into temperature intervals, each interval corresponding to the normal boiling point of the appropriate n-alkane. In this way, the total boiling point curve is scaled as a distribution of n-alkanes.

Although there has been general recognition of the process of distillation or volatilization of hydrocarbons occurring in steam recovery processes, a method for enhancing oil recovery by injection of a selective mixture of hydrocarbons along with steam has not been available. There is a need for methods to improve recovery from thermal processes in which heat is injected into the reservoir in the form of a flood or to promote gravity drainage of very viscous crude oil from a formation. The method should be applicable in all reservoirs containing such petroleum.

SUMMARY OF THE INVENTION

A method is provided for enhancing recovery of viscous petroleum from an underground formation by injecting into the formation hydrocarbons having a boiling point between the boiling point of water and the boiling point of the heaviest hydrocarbon which can be volatilized when combined with steam at conditions in the steam zone in the formation of interest. Hydrocarbons having a boiling point significantly higher than the boiling point of water may be selected. In one embodiment, the boiling point range of hydrocarbons to be injected is determined by analyzing hydrocarbons near the steam-oil interface at one or more locations in the formation after steam injection into the formation. In yet another embodiment, a laboratory flood is used to simulate conditions in a formation of interest to determine the range of hydrocarbon composition to be injected. In yet another embodiment, a computer simulation of a steam flood in a formation of interest is used to select the hydrocarbon composition to be injected. The hydrocarbons having selected boiling points are injected with steam or ahead of steam injection into the formation.

DETAILED DESCRIPTION OF PREFERRED EMBODIMENTS

Figure 1:
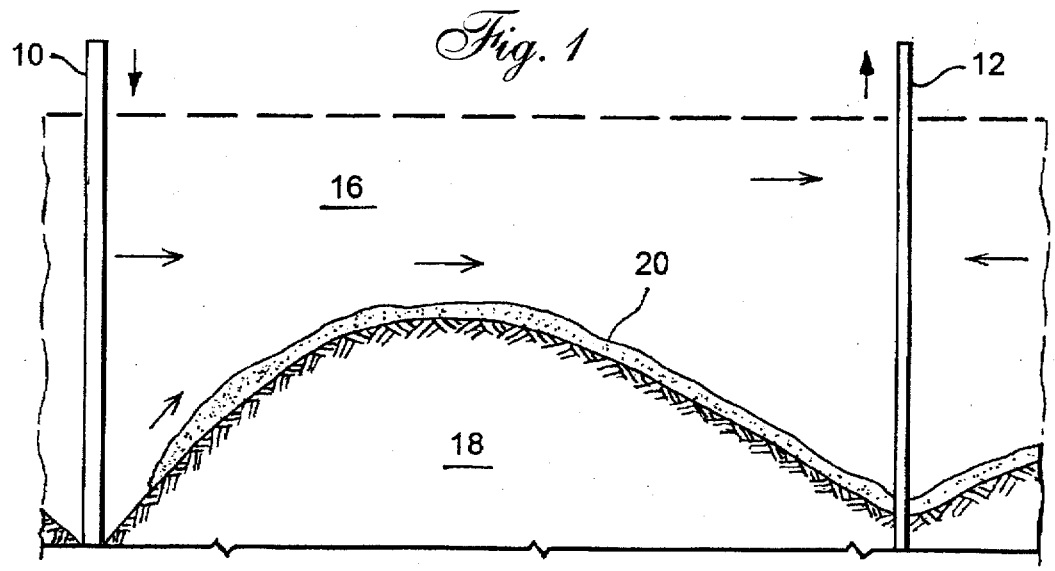
FIG. 1 is a sketch of a mature steam flood showing steam over-riding petroleum in a formation to form a "steam chest."

A steam flood at a mature stage, when steam injection has been in progress in productive formation 5 long enough for quantities of steam injected into well 10 to reach production well 12, is depicted in FIG. 1. "Steam chest" 16 contains steam and hot water, hydrocarbon vapors and residual oil, the oil being trapped in the pore spaces of the formation rock. The over-riding of steam has caused breakthrough of steam into production well 12 while a large portion of the lower segment of productive formation 5, indicated as segment 18, has not been flooded by steam.

Steam chest 16 has a pressure at or below the saturated steam pressure at the temperature of the steam chest. Liquid-filled segment 18, containing water and oil, is at a temperature below that of the steam chest 16. A fairly steep temperature gradient exists near the interface between steam chest 16 and segment 18. Solvent zone 20 has formed at the interface because the temperature gradient leads to condensation of steam and hydrocarbon vapor near the interface. In this zone, a liquid hydrocarbon solvent may form from hydrocarbon vapor which has been steam distilled from the petroleum. The solvent may condense above zone 20 and flow downward into zone 20 by the action of gravity. Solvent zone 20 can aid in recovery of viscous petroleum by mixing with the oil in segment 18 to lower its viscosity and swell its volume and by miscibly displacing the oil and increase the volume of fraction of distillable oil to become part of the steam chest.

By the method of this invention, a hydrocarbon or mixture of hydrocarbons is injected at injection well 10 to cause or enhance the formation of a solvent zone such as zone 20. The hydrocarbon mixture may be injected at any phase of the oil-recovery process before completion of injection of steam. The proper hydrocarbon additive mixture will have the following physical qualities: it will be volatile at the conditions of the steam chest but will not be so volatile that it will not condense in significant quantities in the cooler regions of the reservoir. Since steam flood temperatures vary depending upon the properties of the petroleum, the depth of the deposit, reservoir pressure and other factors, the optimum solvent mixture will also vary depending upon reservoir conditions. The distribution of equivalent alkane carbon numbers (EACN) of the hydrocarbon additive is preferably over an extended range in relation to the temperatures present in the steam chest. This will help insure that condensing hydrocarbon solvent will be "painting," or spreading across an extended area of, the gas-liquid interface during the thermal recovery process. The condensed hydrocarbon mixes with the remaining petroleum in the cooler region, and thereby aids in moving oil to a producing well, whether the oil is moved by viscous pressure gradients of flooding or by gravity drainage. By selecting the composition of the mixture, the amount of hydrocarbon condensing at different regions of the interface may be controlled.

Figure 2:
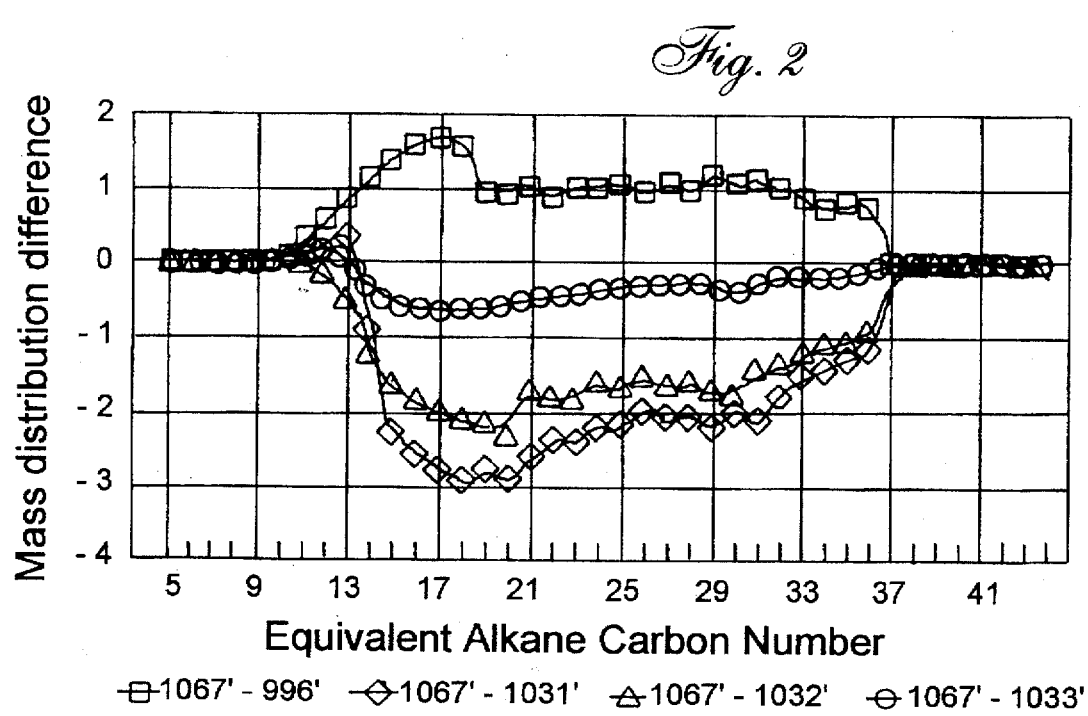
FIG. 2 is a graph showing the mass distribution difference for different equivalent alkane carbon number hydrocarbons after steam flooding in the Kern River Field, Calif.

FIG. 2 shows the equivalent alkane carbon number (EACN) of the hydrocarbons which were separated from the petroleum and preferentially concentrated at the interface between the steam and hydrocarbon after a steam flood in the Kern River Field. The "mass distribution difference" is plotted as a function of the equivalent alkane carbon number of components of the hydrocarbon extracted from cores taken at five different depths in the formation in an area where steam flooding had occurred for six years. The mass difference distribution is a distribution obtained by taking the difference between oil that may have changed composition due to the process and a baseline oil representative of oil in the formation at the beginning of the process. In practice, the baseline oil may be the least perturbed oil at the bottom of the zone of interest. The oil extracted from the core from a depth of 1067 feet was assumed to have the composition of the petroleum in the reservoir, since this depth was 35 feet below the visible steam-oil interface, which was seen in the core sample taken at the depth of 1032 feet. The hydrocarbons extracted from cores at 1031 feet, 1032 feet and 1033 feet all showed increases in concentration of hydrocarbons in the range of equivalent alkane carbon number (EACN) from about 10 (decane) to about 37. This mass distribution difference means that hydrocarbons in this range of EACN were separated from the petroleum, moved by steam flow and then condensed in a condensation zone near the bottom of the steam chest. This range of EACN corresponds to a molecular weight range of about 142 to 520 and a boiling point range of about 344° F. to about 910° F. In this steam flood, steam temperature in the steam chest was only about 250° F. Since steam floods may sometimes operate at temperatures several hundred degrees higher than this, the EACN of hydrocarbons which become mobile due to steam distillation may be considerably higher in a high-temperature steam flood. Only small quantities of hydrocarbons having a boiling point above about 910° F. are expected to become mobile during steam floods, however.

The sample of hydrocarbon extracted from the core taken at a depth of 996 feet, 34 feet above the steam-oil interface and in the zone where steam had been flooded for several years, showed pronounced reduction of mass distribution difference over the same range of equivalent alkane carbon number, as illustrated in FIG. 2.

In the method of this invention, the hydrocarbon additive may be injected into a well along with steam or ahead of steam injection. The hydrocarbon may be injected as a vapor or a liquid. Preferably, the hydrocarbon is entrained as a vapor and injected with the steam at the surface. The ratio of hydrocarbon to steam injected, in equivalent liquid volumes, is preferably less than 10%.

It has been observed that the oil recovery efficiency of steam floods in some very heavy oil reservoirs, such as the Cat Canyon Field in California, is less than expected. This is believed to be due in part to reduced hydrocarbon solvent formation by steam distillation in this reservoir, resulting from the fact that the petroleum contains lesser amounts of hydrocarbons in the important range of EACNs needed to facilitate formation of an ample solvent zone. Reservoirs containing such crude oils will be particularly good candidates for the methods of this invention. Such crude oils can be identified by determination of the volume of components having EACNs in the range of those needed for steam flooding the reservoir.

The solvent hydrocarbons may be injected at any stage during a thermal recovery process. They may be injected along with the first thermal fluid injection or at the more mature stages of a flood or gravity drainage project, after a steam chest has formed in the reservoir. The hydrocarbon solvent to be injected will normally be a selected cut from a distillation process in a refinery. Such higher molecular weight solvents are widely available in the industry.

The proper boiling point range or molecular weight range to be employed in a particular reservoir may be selected to include those hydrocarbons shown to be mobile such that they move to form a solvent bank in the reservoir under steam flood conditions. The distribution of amount of hydrocarbons having different boiling points will also determine the amount of solvent zone formed at different locations in the reservoir and may affect the efficiency of oil recovery achieved. The selection process for a hydrocarbon mixture to be injected may be carried out by various methods. This determination may be based upon core analyses in the reservoir of interest and measurements of equivalent alkane carbon numbers at different locations in the reservoir, such as described for the Kern River Field herein and in SPE Paper No. 27796, referenced above. Alternatively, the boiling points of hydrocarbons to be injected can be selected using steam floods in scaled physical models in the laboratory, such as described, for example, in the paper by K. D. Kimber, "Scaled Physical Modeling of Steam-Injection Experiments," *SPE Reservoir Engineering*, August 1991. Mathematical models, such as described, for example, in the paper by R. S. Johnson et al in *SPE Reservoir Engineering*, 7, 75 (1992) may also be used to select the range of boiling points of hydrocarbons to be injected and the amounts of hydrocarbons having different boiling points.

The hydrocarbons injected in the method of this invention may have a boiling point up to and including the boiling point of the hydrocarbon which separates, under steam flood conditions used, from the higher boiling point components of the crude oil to be recovered. For practical purposes, this boiling point will not be more than 910° F. As to the lower limit of boiling points of hydrocarbons injected, the boiling point should be at least high enough that substantial condensation occurs at the interface between the steam chest and the remaining oil. The boiling point of the hydrocarbon should thus be greater than the boiling point of water, and should preferably be greater than 300° F. Even higher boiling point hydrocarbons may be used in some steam drive processes, including those hydrocarbons having a boiling point at least equal to that of decane, which is 345° F. When a mixture of hydrocarbons is used, the mixture should be comprised predominantly of hydrocarbons having boiling points in the ranges specified herein, but small amounts of hydrocarbons may be present having higher or lower boiling points.

It will be appreciated that while the present invention has been primarily described with regard to the foregoing embodiments, it should be understood that variations and modifications may be made in the embodiments described herein without departing from the broad inventive concepts disclosed above or claimed hereafter.

What is claimed is:

1. A method for increasing recovery of viscous petroleum from a subterranean formation having at least two wells penetrating the formation, comprising the steps of:

injecting steam into a first well penetrating the formation;

injecting a mixture of hydrocarbons into the well, the hydrocarbon mixture predominantly comprising hydrocarbons having a boiling point in the range between 212° F. and 910° F.; and producing petroleum from a second well penetrating the same formation.

2. The method of claim 1 wherein the hydrocarbon mixture predominantly comprises hydrocarbons having a boiling point in the range between 300° F. and 910° F.

3. The method of claim 1 wherein the hydrocarbon mixture predominantly comprises hydrocarbons having a boiling point in the range between 344° F. and 910° F.

4. The method of claim 1 wherein the hydrocarbon mixture is injected into a first well after breakthrough of steam into a second well which is spaced apart from the injection well.

5. The method of claim 1 wherein the mixture injected is a selected cut of hydrocarbons from a distillation process.

6. The method of claim 1 wherein the composition of the mixture of hydrocarbons to be injected is selected from analysis of hydrocarbons removed from cores taken in the reservoir of interest.

7. The method of claim 1 wherein the composition of the mixture of hydrocarbons to be injected is selected by steam flooding a physical model under conditions which simulate formation conditions in the reservoir of interest.

8. The method of claim 1 wherein the composition of the mixture of hydrocarbons to be injected is selected by computer simulation of the steam flood in the reservoir of interest.

9. The method of claim 1 wherein the ratio of hydrocarbons to steam injected, as measured on an equivalent liquid volume, is less than 10 per cent.

10. The method of claim 1 wherein the hydrocarbon mixture is injected as a vapor mixed with steam.

11. The method of claim 1 additionally comprising the step, before injection of a hydrocarbon mixture, of analyzing the petroleum in a reservoir of interest to determine the distribution of boiling points of hydrocarbons in the petroleum.

* * * * *